(12) United States Patent
Wassick

(10) Patent No.: US 6,471,456 B2
(45) Date of Patent: Oct. 29, 2002

(54) MOBILE CONTAINMENT PAD

(76) Inventor: Eric Montgomery Wassick, P.O. Box 106, Red Deer, AB (CA), T4N 5E7

( * ) Notice: Subject to any disclaimer, the term of this patent is extended or adjusted under 35 U.S.C. 154(b) by 0 days.

(21) Appl. No.: 09/770,880

(22) Filed: Jan. 26, 2001

(65) Prior Publication Data

US 2002/0127075 A1 Sep. 12, 2002

(30) Foreign Application Priority Data

Sep. 1, 2000 (CA) .......................................... 2318295

(51) Int. Cl.⁷ .................................................. B60P 9/00
(52) U.S. Cl. .......................................... 410/46; 410/4
(58) Field of Search .......................... 410/46, 3, 4, 35, 410/24, 26; 108/51.11, 57.17, 24, 64; 248/346.02; 220/4.12, 571

(56) References Cited

U.S. PATENT DOCUMENTS

| | | | |
|---|---|---|---|
| 2,828,931 A | * | 4/1958 | Harvey .......................... 410/46 |
| 4,307,985 A | * | 12/1981 | Desprez et al. ............... 410/46 |
| 4,911,590 A | * | 3/1990 | Green .......................... 410/26 |
| 5,092,251 A | | 3/1992 | Hamaker et al. |
| 5,106,246 A | * | 4/1992 | Chance ........................ 410/26 |
| 5,213,458 A | * | 5/1993 | Preller et al. ................ 410/26 |
| 5,253,975 A | * | 10/1993 | Takaguchi ................ 410/26 X |
| 5,511,683 A | | 4/1996 | Dailey |
| 5,562,047 A | | 10/1996 | Forney et al. |
| 5,706,662 A | * | 1/1998 | Van .......................... 410/46 X |
| 5,718,351 A | | 2/1998 | Rude |
| 5,887,529 A | * | 3/1999 | John et al. ................ 108/64 X |

FOREIGN PATENT DOCUMENTS

| | | |
|---|---|---|
| CA | 2063325 | 9/1993 |
| CA | 2115278 | 2/1997 |
| CA | 2176273 | 8/1997 |

* cited by examiner

Primary Examiner—Stephen T. Gordon
(74) Attorney, Agent, or Firm—Killworth, Gottman, Hagan & Schaeff, L.L.P.

(57) ABSTRACT

A mobile containment pad stores liquid washed from vehicles. At least two modules are attached end-to-end. Each of these modules has a base, side walls and end walls to form a shallow tank. Spaced support members within the tank divide it into a series of troughs and also support a grating to mount a vehicle. A ramp permits the vehicle to be driven onto or off the grating. In accordance with preferred aspects, there are provisions to facilitate cleaning the modules.

12 Claims, 9 Drawing Sheets

MOBILE CONTAINMENT PAD

BACKGROUND

This invention relates to a mobile containment pad for toxic liquids washed from vehicles.

Vehicles used for spraying insecticide and other toxic fluids or vehicles contaminated with grease, oil, contaminated water or other materials present a problem. They cannot be washed in a conventional manner, with the wash water directed to a sewer. Yet cleaning such vehicles is particularly important prior to entry onto seed-growing farms or other sensitive environmental areas.

Gross Canadian Patent 2,115,278: and Canadian Application 2,176,273 approach this problem by providing an impermeable deck sloping towards a drain. But this solution would be impractical in a mobile system. Instead, tarps, wooden matting and dug pits have been used which, however, leave contaminated areas. These areas cannot readily be cleaned or decontaminated. The tarps and wooden matting must be disposed of after each use, as they are themselves contaminated. There is likely to be run-off resulting in contaminated soil. The use of dug pits also leaves contaminated soil.

Forney Canadian Patent 2,174,920 provides a modular spill deck for the different purpose of supporting containers of hazardous materials, but his system is not suitable for mounting vehicles. Also, there is a lack of ability effectively and economically to clean the system for re-use.

An object of this invention is to provide a portable system.

A further object is to give substantially total containment of the toxic material.

Another object is to provide a system which can effectively be cleaned up for re-use.

SUMMARY OF THE INVENTION

A mobile containment pad stores liquid washed from vehicles. At least two modules are attached end-to-end. Each of these modules has a base, side walls and end walls to form a shallow tank. Spaced support members within the tank divide it into a series of troughs and also support a grating to mount a vehicle. A ramp permits the vehicle to be driven on or off the grating.

In accordance with preferred aspects of this invention, there are provisions to facilitate cleaning the modules including pivoting sections of the grating and outlets in the side walls to provide liquid connections to flush out the interior. Also, slats forming the grating are spaced to accommodate a vacuum hose.

SUMMARY OF DRAWINGS

In the drawings which illustrate the preferred embodiments of this invention.

Description of the Preferred Embodiment

Figure 1:
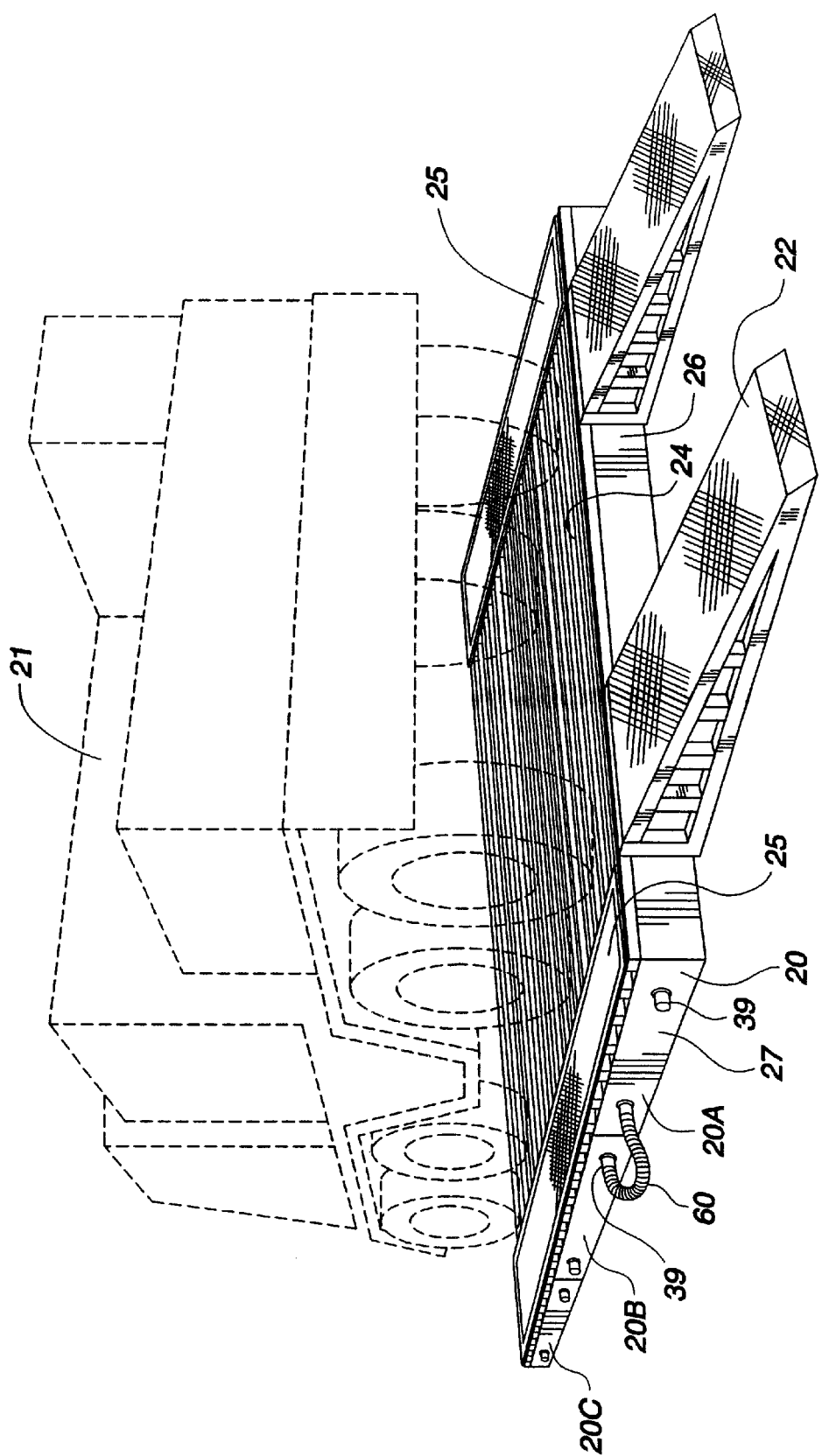
FIG. 1 is a perspective view of a mobile containment pad in accordance with this invention showing a truck that is to be cleaned in position on the pad.

FIG. 1 of the drawings illustrates a mobile containment pad supporting a vehicle 21 which is to be washed. A pair of ramps 22 permit the vehicle to be loaded onto the pad. The pad shown in FIG. 1 is made up of three modules 20A, 20B and 20C.

Figure 4:
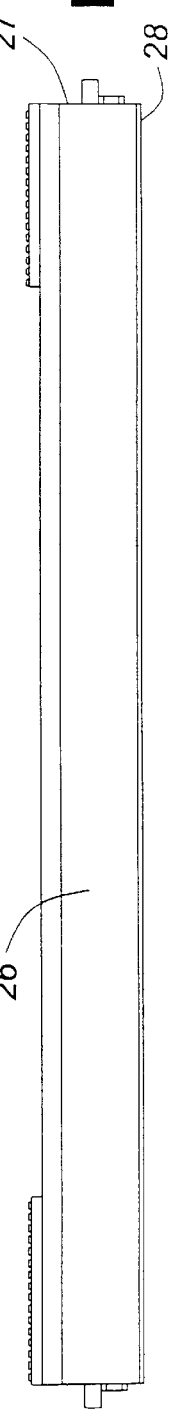
FIG. 4 is an elevation view of the pad shown in FIG. 3.
Figure 5:
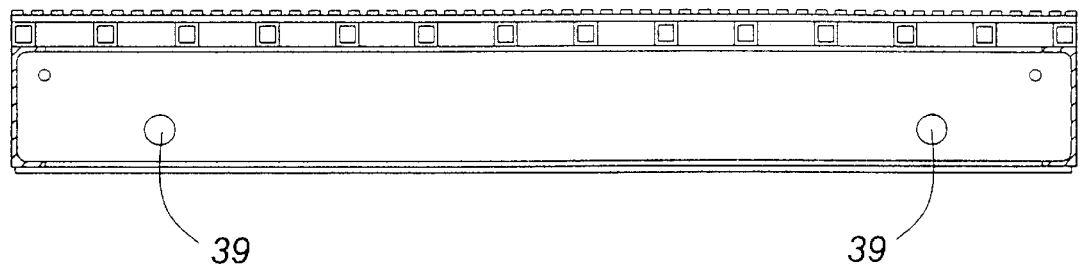
FIG. 5 is an end view of the pad of FIG. 3.
Figure 6:
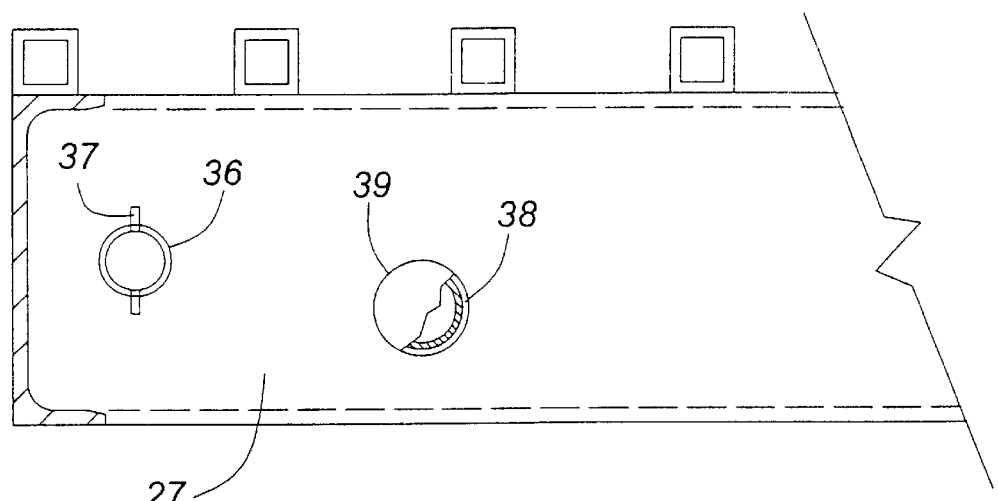
FIG. 6 is a detail view of part of FIG. 5.
Figure 7:
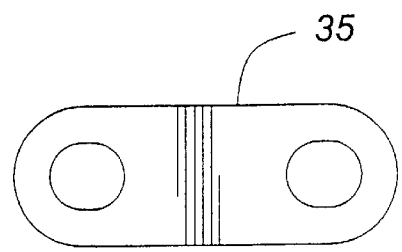
FIG. 7 is a connecting link for joining the modules.
Figure 8:
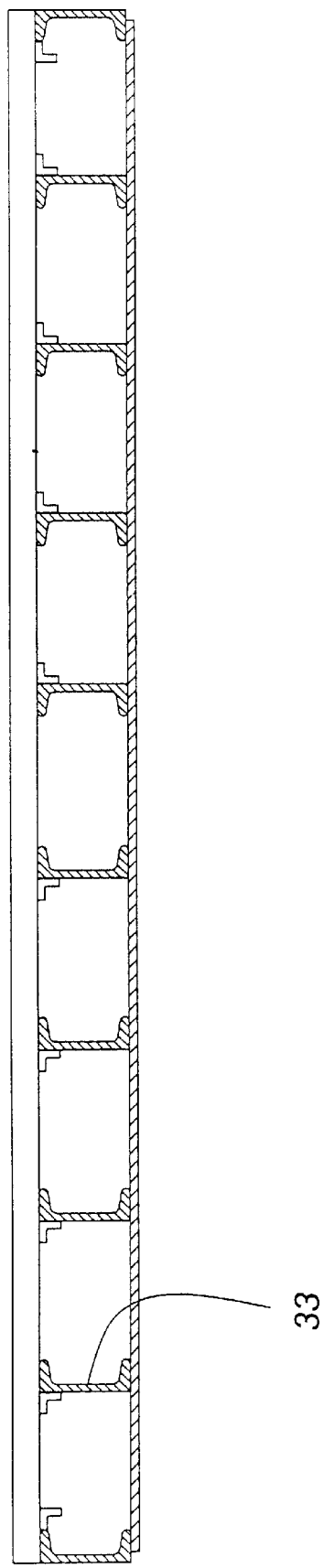
FIG. 8 is a section view on the line 8—8 of FIG. 3.

The pad includes a grating 24, upon which there are lateral walkways 25. The pad has end walls 26, side walls 27 and base 28 (FIG. 4) to provide a shallow tank. Preferably, the side walls do not exceed 8 feet in length, as loads not greater than 8 feet in width can be transported without a permit in many jurisdictions.

Figure 2:
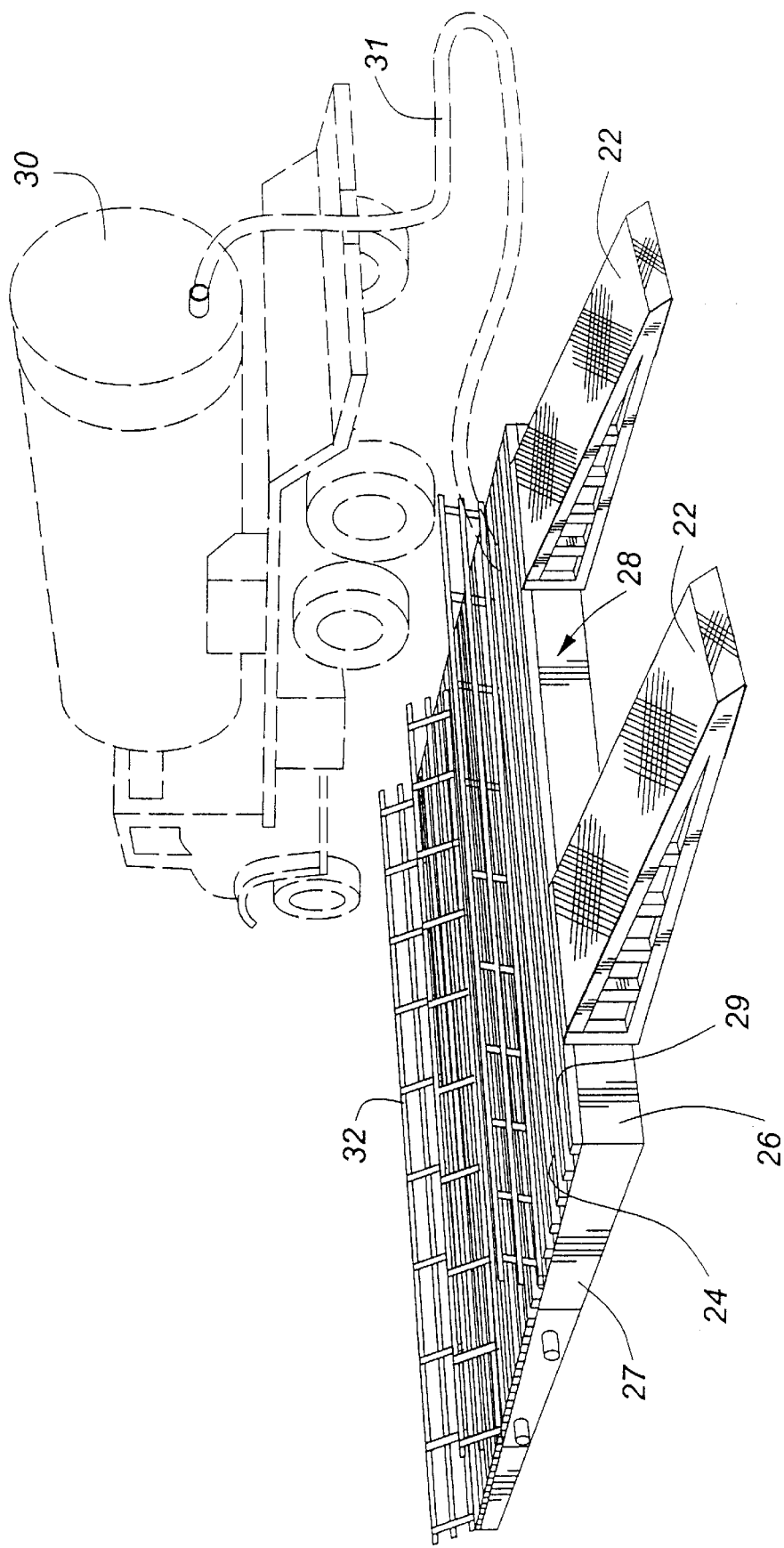
FIG. 2 is a perspective view of the containment pad of FIG. 1 with its walkways removed and with sections-of its grating pivoted open for cleaning.
Figure 3:
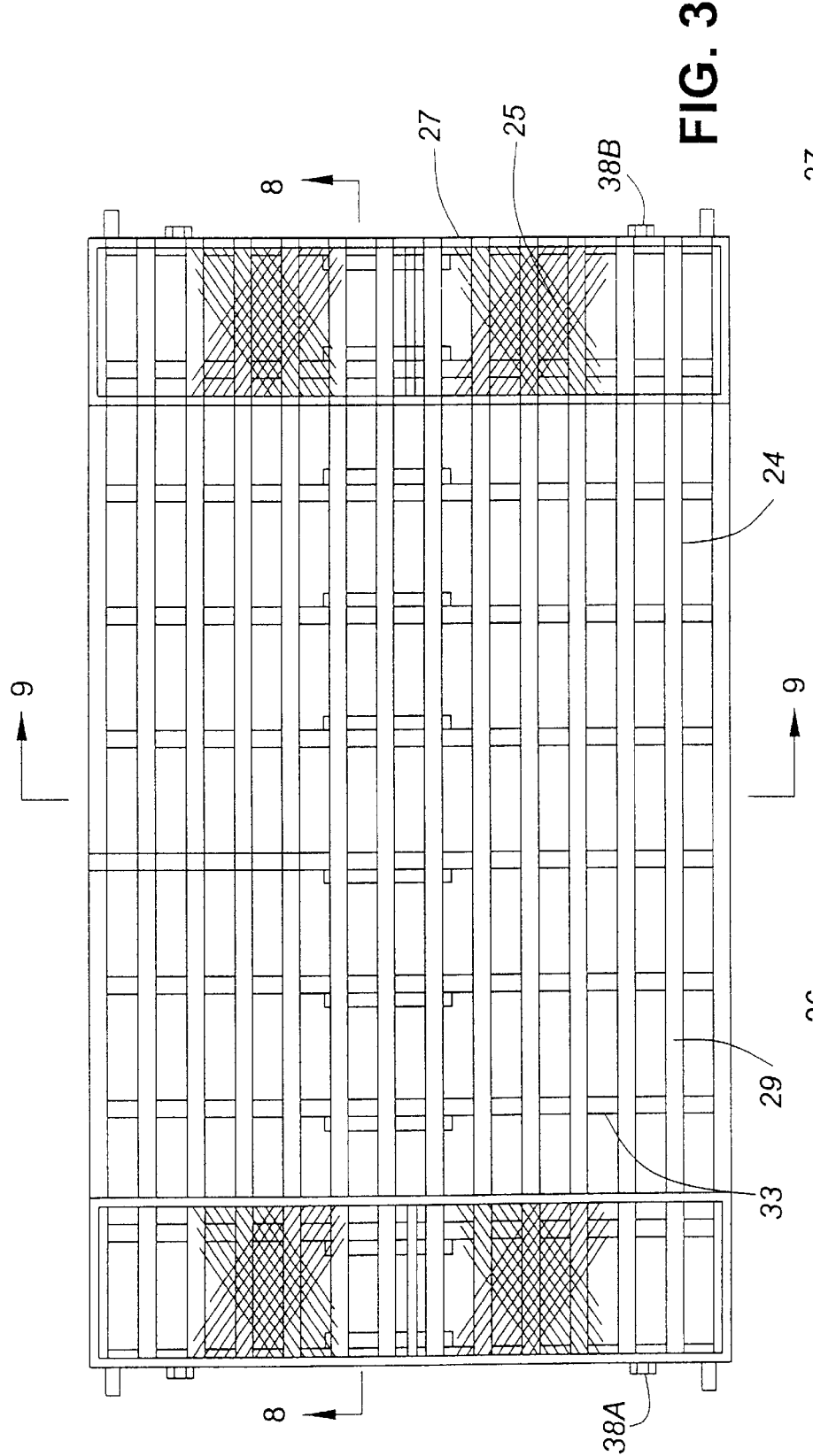
FIG. 3 is a plan view of the mobile containment pad.

FIG. 2 illustrates a method of cleaning the pad shown in FIG. 1. A suction pipe 31 is inserted between the spaced slats 29 of grating 24 to empty liquid within the pad into a tanker 30. Sections 32 of grating 24 are pivoted to provide access to the interior of the pad to scrape out any solid residue.

The mobile pad is illustrated in more detail in FIGS. 3 to 12. Grating 24 is formed from slats 29 which are spaced sufficiently to permit liquid to be collected in the pad with a minimum of run-off when a vehicle is being cleaned. They also should accommodate suction pipe 31 as shown in FIG. 2. Slats 29 are mounted on spaced support channels 33 which divide the tank into troughs. Apertures 34 (FIG. 9) provide liquid communication between these troughs.

The modular pads are releasably connected together by links 35 (FIG. 7) which attach onto nipples 36 (FIG. 6) and are secured by cotter pins 37 to sidewall 27. This then provides lateral connections which can readily be disconnected for transport of the modules. Sidewalls 27 also are penetrated by tubular outlets 38. Outlets 38 are normally capped by caps 39 which are shown partly in section in FIG. 6, for convenience of illustration. A hose may be connected to an outlet 38A to flush out the interior of the pad. The liquid used to flush out the interior may enter through outlet 38A (FIG. 3) and pass through holes 34 (FIG. 9) and may be extracted through outlet 38B at the other side of the module. Alternatively, the liquid used for flushing may be withdrawn using a suction pipe 31, as illustrated in FIG. 2. A hose 60 or other inter-connection means may connect outlets 38 of adjacent pads to allow the liquid to flow between pads.

Figure 9:
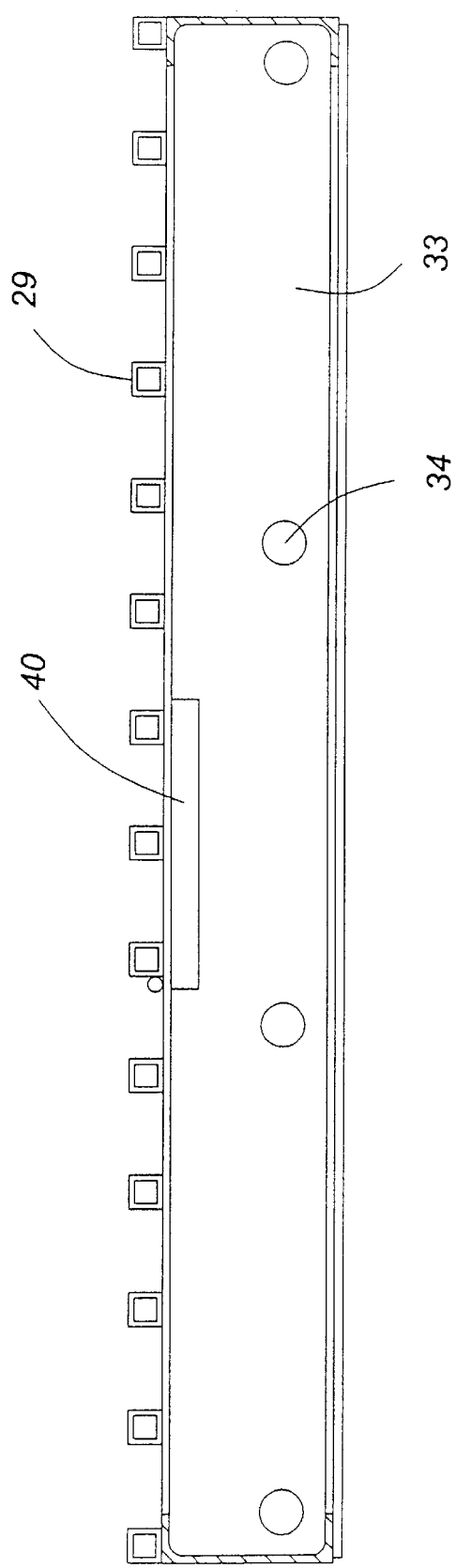
FIG. 9 is a section view on the line 9—9 of FIG. 3.
Figures 10, 11:
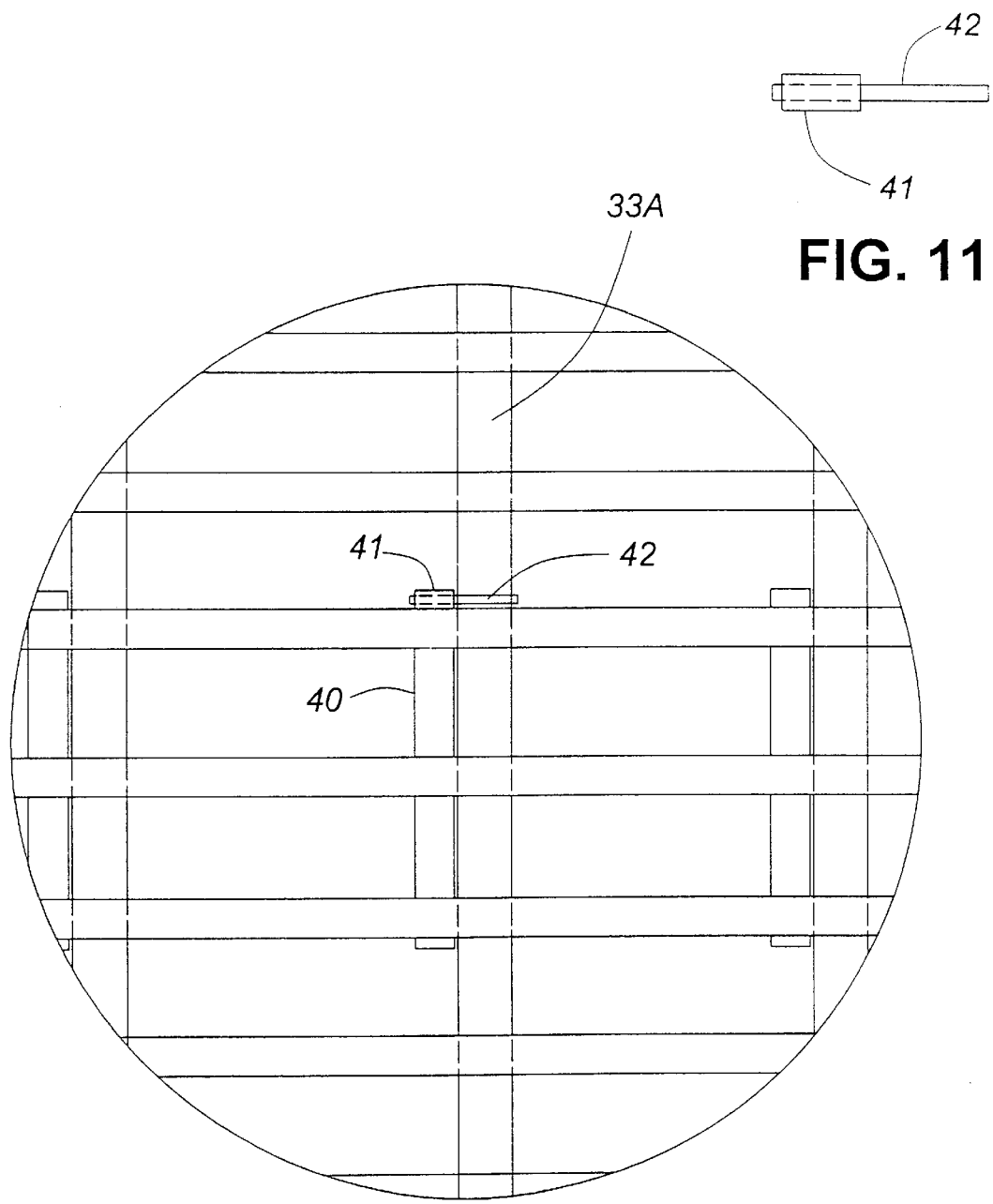
FIG. 10 is a detail view of a section of the hinged portion of the grating in FIG. 3.
FIG. 11 is a further detail of the hinge in FIG. 10.

As referred to in describing FIG. 2, sections 32 of grating 24 are pivoted to provide access to the interior of the pad to scrape out any solid residue. As shown in FIGS. 9–11, several of the slats 29 are mounted on bars 40. Sleeve 41 is welded to bar 40. Pin 42 is welded to support channel 33A and is rotatable within sleeve 41. Pivoting takes place about an axis transverse to the support channels so as to give access to each of the troughs between the support channels. The pivoting section of the grating extends to the full width of the pad so that all troughs will be accessible. Preferably, it is centrally located between the end walls 26 so that the whole length of each trough will be readily accessible to clean out any solid residue.

Figure 12:
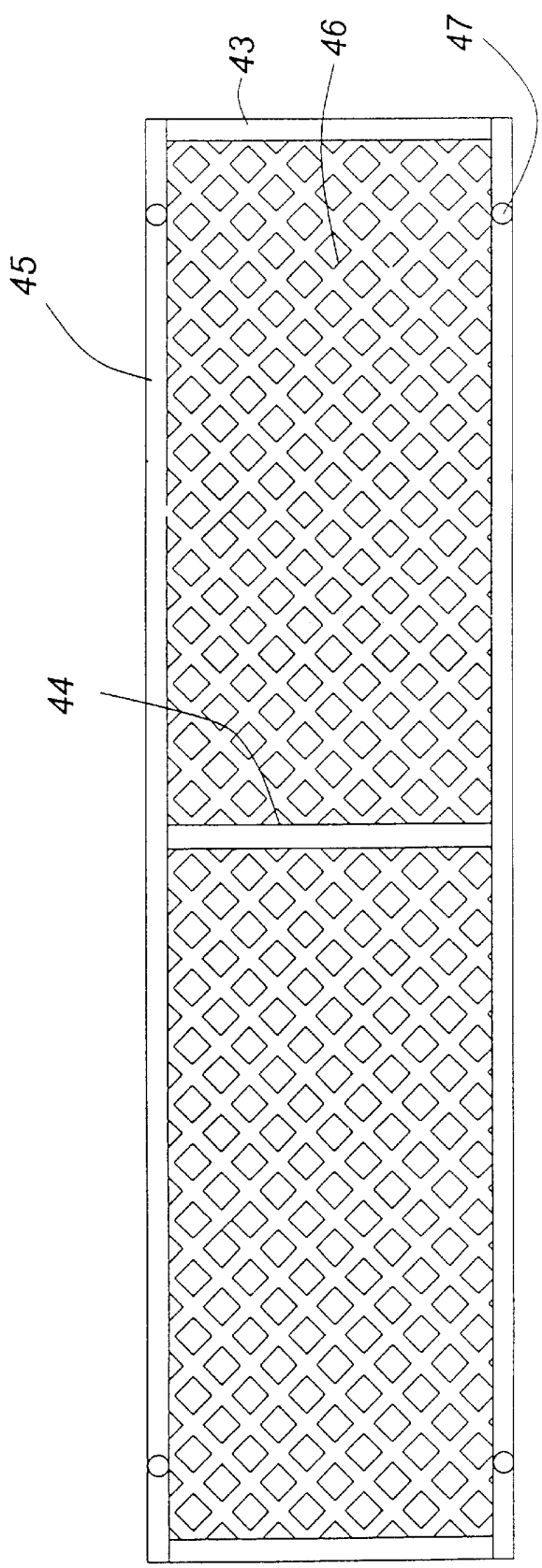
FIG. 12 is a detail view of the walkway shown in FIG. 3.

Walkways 25 are illustrated, upside down, in FIG. 12. There are supporting frame members 43, 44 and 45 on which is mounted plate 46 which is of expanded metal. The metal preferably has small apertures for liquid to penetrate. Pins 47 engage between slats 29 to hold the walkway in position. A walkway is desirable as personnel cleaning vehicles on the pad would find it difficult to walk on the spaced slats 29.

Figure 13:
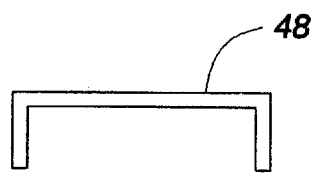
FIG. 13 is a detail view of a cap at the connection of the modules.

As shown in FIG. 13, a cap 48 may be provided to fit over the end walls 26 or over the slats 29 that are immediately over the end walls at the adjacent ends of a pair of modules to minimize leakage between the modules. This cap 48 extends substantially the full width of the end walls.

It will be understood that an important economy is achieved when it is possible to re-use wash water. Water drained from within the pad using a suction hose or withdrawn from outlets 38 can be filtered and re-used, depending on the nature of the contamination.

Figure 14:
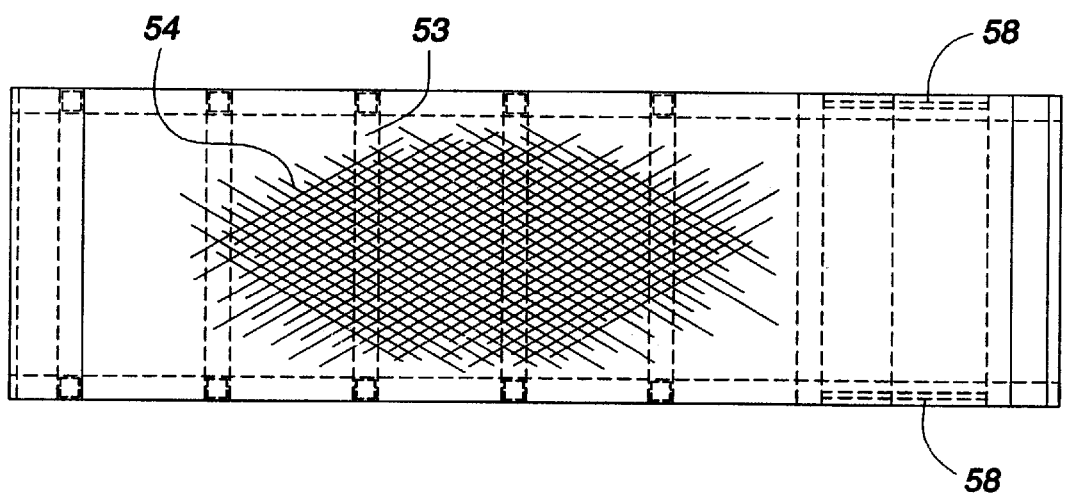
FIG. 14 is a plan view of the ramp shown in FIGS. 1, 2 and 3.
Figure 15:
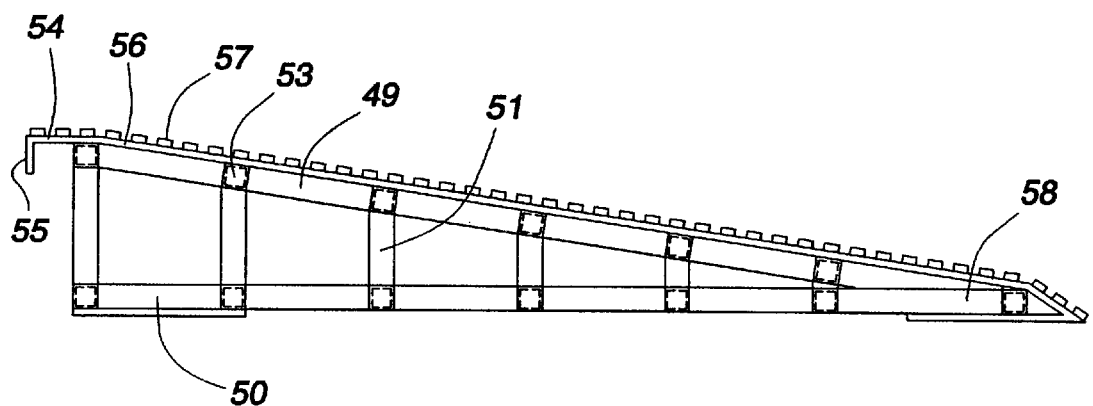
FIG. 15 is an elevation view of the ramp of FIG. 12.

A ramp or ramps are provided to permit a vehicle to be driven onto the modular pad. FIGS. 14 and 1S provide details of the ramps shown in FIG. 2. They include base frame members 50 and inclined frame members 49 connected by vertical frame members 51. Transverse frame members 53 connect inclined member 49 on each side of this ramp. A plate 54 is secured to frame members 49 and 53 and includes a hook 55 at its upper end for securement to end wall 26. Plate 54 may be of expanded metal 57 mounted on a back plate 56. gusset plate 58 is desirable.

The embodiments of the invention in which an exclusive property or privilege is claimed are defined as follows:

1. A mobile containment pad for toxic liquids washed from vehicles comprising at least two modules attached end-to-end, each having a base, side walls and end walls to form a shallow tank, spaced support members within said tank to divide the tank into a series of troughs, means providing liquid communication between said troughs, a grating to mount a vehicle on the support members and a ramp to permit a vehicle to be driven onto or off the grating.

2. A containment pad as in claim 1 in which there are outlets in the sidewalls of each module to drain liquid from within the pad or to permit flushing out the pad interior.

3. A containment pad as in claim 1 in which the grating comprises slats spaced sufficiently to receive a suction pipe between them.

4. A containment pad as in claim 1, comprising a walkway on the grating at each side of the modules.

5. A containment pad as in claim 1 in which there is an additional ramp, whereby a ramp is positioned at each end of the connected modules.

6. A containment pad as in claim 1 in which a section of the grating of each module is hinged to permit the section to pivot open for cleaning about an axis transverse to the support members.

7. A containment pad as in claim 1 in which there is a cap on the adjacent end walls of each module extending substantially the width of the end walls to protect against leakage between said end walls.

8. A containment pad for toxic liquids washed from vehicles comprising at least two modules attached end-to-end, each having a base, side walls and end walls to form a shallow tank, support members within the tank, a grating to mount a vehicle on the support members, outlets in the side walls of each module and means interconnecting outlets in different modules to provide liquid communication between the modules, such interconnecting means being adapted to be disconnected from at least one outlet to drain liquid within the paid or to flush out the pad.

9. A containment pad as in claim 8 in which there is a ramp at an end wall of a module to permit a vehicle to be driven onto or off the grating.

10. A containment pad as in claim 8 including a walkway on the grating along each side of the pad.

11. A containment pad as in claim 1 in which grates of the grating are spaced sufficiently so that a suction nozzle can penetrate between them.

12. A containment pad as in claim 8 in which a pair of connecting bars is releasably attached to the exterior surface of the side walls of each pair of adjacent modules to secure the modules to each other.

* * * * *